United States Patent Office 3,577,449
Patented May 4, 1971

3,577,449
PROCESS FOR THE PREPARATION OF A COMBUSTION ADDITIVE
Charles I. Ashmore, Manassas, Va., assignor to Thiokol Chemical Corporation, Bristol, Pa.
No Drawing. Filed Jan. 7, 1969, Ser. No. 789,623
Int. Cl. C07j 15/02
U.S. Cl. 260—439                2 Claims

ABSTRACT OF THE DISCLOSURE

A process for the preparation of 1,3-diferrocenyl-1-butene which comprises the mixing and reacting under the application of heat 1-ferrocenylethanol with acetic acid.

BACKGROUND OF THE INVENTION

(1) Field of the invention

Increased operational requirements for solid propellant rocket motors has created a problem to which many solutions have been tried, to overcome this problem, which is the increasing of the combustion properties of the solid propellant in the solid propellant rocket motor.

One of the solutions is the addition of a combustion additive to the solid propellant to increase the combustion properties thereof and the instant invention involves a process for the preparation of such a combustion additive.

(2) Description of the prior art

It is well-known that ferrocene is a trade designation which is commonly used to describe bis-(cyclopentadienyl) iron and that 1,3-diferrocenyl-1-butene is a liquid ferrocene derivative which is useful as a combustion additive to increase the combustion properties of solid propellants.

As described in current literature (S. I. Goldburg, W. D. Lobele and T. T. Tidewell, Journal of Organic Chemistry, 32, 4070 (1967), the preparation of 1,3-diferrocenyl-1-butene employs large amounts of an expensive dehydrating agent, as well as large amounts of solvent, and affords the compound in only moderate yield, thereby prohibiting commercial production of the material at a reasonable cost. It has been found that 1,3-diferrocenyl-1-butene may be prepared cheaply and in high yield by the reaction of 1-ferrocenylethanol with acetic acid, thus the instant invention relates to an improved process for the preparation of 1,3-diferrocenyl-1-butene and such improvement results in the low cost of the material, an increase in the yield thereof and, therefore, a reduction in production and product costs.

SUMMARY OF THE INVENTION

This invention relates to an improved process for the preparation of an organometallic compound which is utilized as a combustion additive in solid propellants, and more specifically this invention relates to a process for the preparation of 1,3-diferrocenyl-1-butene.

The process described in the instant invention thus gives access to a useful material which would otherwise be unaccessible, due to the prohibitingly high cost associated with the prior preparation of 1,3-diferrocenyl-1-butene, as previously set forth.

It is an object of the instant invention to provide an improved process for the preparation of 1,3-diferrocenyl-1-butene.

It is a further object of the invention to provide a process that results in the low cost of materials, an increase in yield and thus a low product cost.

The above and other objects and advantages will, it is believed, become more apparent to one skilled in the art from the following detailed description and discussion.

DESCRIPTION OF THE PREFERRED EMBODIMENT

The process described entails the mixture of 1-ferrocenylethanol with acetic acid, followed by the application of sufficient heat to force the reaction to proceed at a reasonable rate.

Typically the acetic acid is used in a ratio of 1 part acetic acid to 1 part 1-ferrocenylethanol, and the temperature is above 25° C., usually at least 100° C., up to the boiling point of the acetic acid. Preferably, the reaction temperature approaches the boiling point of the acid.

The reaction mixture is normally poured into water; after which the supernatant liquid is decanted. The removal of residual supernatant liquid is accomplished by distillation. If a product of analytical purity is desired the 1,3-diferrocenyl-1-butene may be chromatographed on alumina or other suitable substrates.

The following example is given in order to more specifically explain the invention and is not intended to be construed as limitations on this invention.

1-ferrocenylethanol (4.56 lbs.) and acetic acid (0.547 gallon) are mixed and heated at 100° C. for three hours. The mixture is cooled to 15° C. and the 1,3-diferrocenyl-1-butene which settles out is recovered by pouring off the top layer. The product is poured into water to dissolve residual acetic acid, and the water is decanted off. The product is then stripped under vacuum at 60–65° C. Four pounds of product are obtained after the vacuum stripping operation is complete.

Having thus described the invention, what is claimed as new and desired to be secured by Letters Patent is:

1. A process for the preparation of 1,3-diferrocenyl-1-butene which comprises mixing and reacting 1-ferrocenylethanol with acetic acid, and applying heat above 25 degrees C.

2. A process as in claim 1, wherein the mixture is heated for 3 hours and then cooled, the remaining liquid is poured off and the reaction product is then poured into water to dissolve any residual acetic acid, the water is then decanted off and the reaction product is subjected to a vacuum at 60–65 degrees C.

References Cited

Schlögl et al., Naturwissenschaften 9 (1961) pp. 376–7.
Goldberg et al., J. Org. Chem. 32 (1967), pp. 4070–1.
Rosenblum, Chemistry of the Iron Group Metallocenes, Part 1 (1965), Interscience Publishers, New York, N.Y., pp. 134–5.

TOBIAS E. LEVOW, Primary Examiner

A. P. DEMERS, Assistant Examiner

U.S. Cl. X.R.

149—109